US006548212B1

(12) United States Patent
Heider et al.

(10) Patent No.: US 6,548,212 B1
(45) Date of Patent: Apr. 15, 2003

(54) USE OF ADDITIVES IN ELECTROLYTE FOR ELECTROCHEMICAL CELLS

(75) Inventors: Udo Heider, Riedstadt (DE); Michael Schmidt, Weiterstadt (DE); Anja Amann, Brensbach (DE); Marlies Niemann, Büttelborn (DE); Andreas Kühner, Darmstadt (DE)

(73) Assignee: Merck Patent GmbH (DE)

( * ) Notice: Subject to any disclaimer, the term of this patent is extended or adjusted under 35 U.S.C. 154(b) by 0 days.

(21) Appl. No.: 09/524,922

(22) Filed: Mar. 13, 2000

(30) Foreign Application Priority Data

Mar. 12, 1999 (DE) .......................... 199 10 968

(51) Int. Cl.[7] .............................................. H01M 6/14
(52) U.S. Cl. .................... 429/307; 429/322; 252/62.2
(58) Field of Search ................. 429/306, 307, 429/323, 322; 252/62.2

(56) References Cited

U.S. PATENT DOCUMENTS

| 5,660,947 A |   | 8/1997  | Wuhr         |
| 5,691,083 A | * | 11/1997 | Bolster      |
| 5,741,606 A |   | 4/1998  | Mayer et al. |
| 5,753,389 A |   | 5/1998  | Gan et al.   |
| 5,776,627 A |   | 7/1998  | Mao et al.   |
| 6,022,643 A | * | 2/2000  | Lee et al.   |

FOREIGN PATENT DOCUMENTS

| EP | 631340      |   | 12/1994 |
| EP | 0746050     |   | 12/1996 |
| EP | 0759641     |   | 2/1997  |
| EP | 0851524     |   | 7/1998  |
| EP | 0856901     |   | 8/1998  |
| FR | 2704099     |   | 10/1994 |
| JP | 09-283176   | * | 10/1997 |
| WO | WO-98/07729 | * | 2/1998  |
| WO | 9828807     |   | 7/1998  |

OTHER PUBLICATIONS

Barthel J.: "a new class of electrochemically and thermally stable lithium salts for lithium battery electrolytes" J. Electrochem. Soc., vol. 144, No. 11, Nov. 1997, XP002140970.
Barthel J.: "New Class of Electrochemically and Thermally Stable Lithium Salts OFR Lithium Battery Electrolytes" Journal of the Electrochemical Society, vol. 147, No. 1, Jan. 1, 2000 p. 21–24 XP002140971.

* cited by examiner

*Primary Examiner*—Patrick Ryan
*Assistant Examiner*—Susy Tsang-Foster
(74) *Attorney, Agent, or Firm*—Millen, White, Zelano & Branigan, PC (57) ABSTRACT

The invention relates to the use of salt-based compounds as additives in electrolytes for improving the properties of electrochemical cells.

5 Claims, 7 Drawing Sheets

USE OF ADDITIVES IN ELECTROLYTE FOR ELECTROCHEMICAL CELLS

BACKGROUND

The invention relates to the use of salt-based compounds as additives in electrolytes for improving the properties of electrochemical cells.

Lithium ion batteries are amongst the most promising systems for mobile applications. The areas of application extend from high-quality electronic equipment (for example mobile telephones, camcorders) to batteries for electrically driven vehicles.

These batteries consist of a cathode, an anode, a separator and a non-aqueous electrolyte. The cathode is typically $Li(MnMe_z)_2O_4$, $Li(CoMe_z)O_2$, $Li(CoNi_xMe_z)O_2$ or other lithium intercalation and insertion compounds. Anodes can consist of lithium metal, carbon, graphite, graphitic carbon or other lithium intercalation and insertion compounds or alloy compounds. The electrolyte can be a solution containing lithium salts, such as $LiPF_6$, $LiBF_4$, $LiClO_4$, $LiAsF_6$, $LiCF_3SO_3$, $LiN(CF_3SO_2)_2$ or $LiC(CF_3SO_2)_3$ and mixtures thereof, in aprotic solvents.

A multiplicity of additives for use in lithium ion batteries is mentioned in the literature. For example, in EP 0759641 and U.S. Pat. No. 5,776,627, organic aromatic compounds, such as biphenyl, substituted thiophenes and furans, and in EP 0746050 and EP 0851524, substituted anisole, mesitylene and xylene derivatives are added to the electrolyte in order to increase the safety of the battery in the case of overcharging. For the same purpose, U.S. Pat. No. 5,753,389 uses organic carbonates as additives. In order to improve the cycle stability, organic boroxines are added in EP 0856901. However, all these additives have some crucial disadvantages. Organic substances, as used in the specifications mentioned here, generally have low flash points and low explosion limits.

| Additive | Explosion limit [%] | Flash point [° C.] |
| --- | --- | --- |
| Thiophene | 1.5–12 | −9 |
| Anisole | 0.34–6.3 | 43 |
| Mesitylene | 1–6 | 54 |
| Furan | 2.3–14.3 | −35 |

Since the use of electrochemical cells and in particular the occurrence of faults (for example short-circuiting, mechanical damage) is always accompanied by warming, escape of the electrolyte represents an additional source of danger.

SUMMARY OF THE INVENTION

An object of the present invention is therefore to provide additives whose volatility is low and whose flash points are relatively high. This object according to the invention is achieved by the use of organic alkali metal or tetraalkylammonium salts as additive.

Upon further study of the specification and appended claims, further objects and advantages of this invention will become apparent to those skilled in the art.

The organic alkali metal salts are dissolved in electrolytes which are usually employed in non-aqueous secondary lithium batteries.

It has been found that the additives participate in formation of the coating layer on the anode and cathode. The coating layer results in passivation of the electrodes and thus in an increase in the cyclability of the electrodes. Film formation on the cathode can in addition serve increase safety in the event of overcharging, since after release of a mechanical safety means, for example by a disconnector, as described in U.S. Pat. No. 5,741,606, the voltage is dissipated by "internal self-discharge".

The additives are distinguished by very high thermal decomposition points. A crucial advantage over the additives used hitherto is the formation of a glass-like, polymeric layer on thermal decomposition, which can be caused, for example, by a short-circuit.

The invention therefore relates to an electrolyte for non-aqueous secondary lithium batteries which improves the performance, such as, for example, the coating layer formation, cyclability, safety, conductivity and low-temperature behaviour, through the addition of specific additives.

Surprisingly, it has been found that lithium salts which actively participate in the formation of a passivating coating layer on the graphite electrode are suitable for improving the passivation of the anode. It has been found that the quality of the coating layer is crucially improved. Reduction of the additive gives a film which is permeable to lithium ions on the anode. This film leads to improved cyclability of the anode from only the second cycle.

It has furthermore been found that these additives decompose oxidatively at potentials above the charge potential of the selected cathode and thus form a passivating film on the cathode. These films are permeable to lithium ions and protect the selected solvent and conductive salt against oxidative decomposition.

Use in battery systems based on $LiCoO_2$ and $LiNiO_2$ appears particularly interesting. It is known that these electrode materials are unstable in the overcharged state. This can result in a vigorous reaction with the electrolyte, with corresponding safety risks occurring. The state of the art consists of internal safety mechanisms, such as, for example, so-called disconnectors. On overcharging of a battery, gaseous components are generally liberated, with evolution of heat. The resultant pressure increase results in the disconnector breaking the contact between electrode and current conductor and thus preventing further overcharging of the battery. A problem here is that the battery remains in the charged, unstable state.

External discharge is no longer possible owing to the irreversible breaking or contact.

The aim is, through addition of selected additives, to apply a film to the cathode in the event of overcharging, i.e. at potentials above the charge voltage, which film reacts with the cathode in a controlled manner after addressing of the disconnector and thus dissipates the "excess potential" through internal self-discharge.

A general example of the invention is explained in greater detail below.

BRIEF DESCRIPTION OF THE DRAWINGS

FIG. 4 shows a voltammogram for the experiment of Example 2a;

DETAILED DESCRIPTION a) Behavior of the additives at low potentials

In each case, 3–5 cyclic voltammograms are recorded successively in a measurement cell containing an electrode of lithium metal, carbon, graphite, graphitic carbon or other lithium intercalation and insertion compounds or alloy compounds, a lithium counterelectrode and a lithium reference electrode. Starting from the rest potential, the potential is lowered at a rate of 0.01–1 mV/s to 0 V against Li/Li$^+$ and then moved back to the rest potential.

The charge and discharge capacities $Q_c$ and $Q_d$ respectively are given by numerical integration of the I(t) curves obtained. The cycling yield is obtained from the quotient $Q_c/Q_d$.

Electrolytes which can be used are solutions of LiPF$_6$, LiBF$_4$, LiClO$_4$, LiAsF$_6$, LiCF$_3$SO$_3$, LiN(CF$_3$SO$_2$)$_2$ or LiC(CF$_3$SO$_2$)$_3$ and mixtures thereof, in aprotic solvents, such as ethylene carbonate (EC), dimethyl carbonate (DMC), propylene carbonate(PC), diethyl carbonate(DEC), butylene carbonate (BC), vinylene carbonate (VC), cyclopentanone, sulfolane, dimethyl sulfone (DMS), 3-methyl-1,3-oxazolidin-2-one, γ-butyrolactone, ethyl methyl carbonate (EMC), methylpropyl carbonate(MPC), butyl methyl carbonate (BMC), ethylpropyl carbonate (EPC), butyl ethyl carbonate (BEC), dipropyl carbonate (DPC), 1,2-diethoxymethane, tetrahydrofuran (THF), 2-methyltetrahydrofuran, 1,3-dioxolane, methyl acetate, ethyl acetate and mixtures thereof. The electrolytes can also comprise organic isocyanates (DE 199 44 603) for reducing the water content. Lithium complex salts of the formula where R$^1$ and R$^2$ are identical or different, are optionally directly bonded to one another via a single or double bond, and are each, individually or together, an aromatic ring from the group consisting of phenyl, naphthyl, anthracenyl and phenanthrenyl, which may be unsubstituted or mono- to hexasubstituted by alkyl (C$_1$ to C$_6$), alkoxy groups (C$_1$ to C$_6$) or halogen (F, Cl or Br), or are each, individually or together, an aromatic heterocyclic ring from the group consisting of pyridyl, pyrazyl and pyrimidyl, which may be unsubstituted or mono- to tetrasubstituted by alkyl (C$_1$ to C$_6$), alkoxy groups (C$_1$ to C$_6$) or halogen (F, Cl or Br), or are each, individually or together, an aromatic ring from the group consisting of hydroxybenzocarboxyl, hydroxynaphthalenecarboxyl, hydroxybenzosulfonyl and hydroxynaphthalenesulfonyl, which may be unsubstituted or mono- or tetrasubstituted by alkyl (C$_1$ to C$_6$), alkoxy groups (C$_1$ to C$_6$) or halogen (F, Cl or Br), R$^3$–R$^6$ can each, individually or in pairs and optionally bonded directly to one another by a single or double bond, have the following meanings:
1. alkyl (C$_1$ to C$_6$), alkoxy (C$_1$ to C$_6$) or halogen (F, Cl or Br)
2. an aromatic ring from the groups phenyl, naphthyl, anthracenyl and phenanthrenyl, which may be unsubstituted or mono- to hexasubstituted by alkyl (C$_1$ to C$_6$), alkoxy groups (C$_1$ to C$_6$) or halogen (F, Cl or Br), pyridyl, pyrazyl and pyrimidyl, which may be unsubstituted or mono- to tetrasubstituted by alkyl (C$_1$ to C$_6$), alkoxy groups (C$_1$ to C$_6$) or halogen (F, Cl or Br), which are prepared by the following process (DE 199 32 317):
a) chlorosulfonic acid is added to 3-, 4-, 5- or 6-substituted phenol (III) in a suitable solvent,
b) the intermediate (IV) from a) is reacted with chlorotrimethylsilane, and the product is filtered and subjected to fractional distillation,
c) the intermediate (II) from b) is reacted with lithium tetramethoxyborate(1-) in a suitable solvent, and the end product (I) is isolated therefrom, can also be present in the electrolyte.

The electrolytes can likewise comprise compounds of the following formula (DE 199 41 566):

where

Kt=N, P, As, Sb, S or Se,

A=N, P, P(O), O, S, S(O), SO$_2$, As, As(O), Sb or Sb(O),

R$^1$, R$^2$ and R$^3$ are identical or different and are H, halogen, substituted and/or unsubstituted alkyl C$_n$H$_{2n+1}$, substituted and/or unsubstituted alkenyl having 1–18 carbon atoms and one or more double bonds, substituted and/or unsubstituted alkynyl having 1–18 carbon atoms and one or more triple bonds, substituted and/or unsubstituted cycloalkyl C$_m$H$_{2m-1}$, mono- or polysubstituted and/or unsubstituted phenyl substituted and/or unsubstituted heteroaryl, A can be included in R$^1$, R$^2$ and/or R$^3$ in various positions, Kt can be included in a cyclic or heterocyclic ring, the groups bonded to Kt may be identical or different, where n=1–18 m=3–7 k=0 or 1–6 l=1 or 2 in the case where x=1 and l in the case where x=0 x=0 or 1 y=1–4.

However, use can also be made of electrolytes comprising compounds of the general formula (DE 199 53 638)

where

X is H, F, Cl, C$_n$F$_{2n-1}$, C$_n$F$_{2n-1}$ or (SO$_2$)$_k$N(CR$^1$R$^2$R$^3$)$_2$,

Y is H, F or Cl

Z is H, F or Cl

R$^1$, R$^2$ and R$^3$ are H and/or alkyl, fluoroalkyl or cycloalkyl m is 0–9 and, if X=H, m≠0
n is 1–9
k is 0 if m=0 and k=1 if m=1–9,
and complex salts of the general formula (DE 199 51 804)

in which
x and y are 1, 2, 3, 4, 5 or 6
$M^{x+}$ is a metal ion
E is a Lewis acid selected from the group consisting of $BR^1R^2R^3$, $AlR^1R^2R^3$, $PR^1R^2R^3R^4R^5$, $AsR^1R^2R^3R^4R^5$ and $VR^1R^2R^3R^4R^5$,
$R^1$ to $R^5$ are identical or different, are optionally bonded directly to one another by a single or double bond, and each, individually or together, has the following meaning:
a halogen (F, Cl or Br),
an alkyl or alkoxy radical ($C_1$ to $C_8$), which can be partially or fully substituted by F, Cl or Br,
an aromatic ring, optionally bonded via oxygen, from the group consisting of phenyl, naphthyl, anthracenyl and phenanthrenyl, which may be unsubstituted or mono- to hexasubstituted by alkyl ($C_1$ to $C_8$) or F, Cl or Br,
an aromatic heterocyclic ring, optionally bonded via oxygen, from the group consisting of pyridyl, pyrazyl and pyrimidyl, which may be unsubstituted or mono- to tetrasubstituted by alkyl ($C_1$ to $C_8$) or F, Cl or Br, and
Z is $OR^6$, $NR^6R^7$, $CR^6R^7R^8$, $OSO_2R^6$, $N(SO_2R^6)(SO_2R^7)$, $C(SO_2R^6)(SO_2R^7)(SO_2R^8)$ or $OCOR^6$, where
$R^6$ to $R^8$ are identical or different, are optionally bonded directly to one another by a single or double bond and are each, individually or together,
hydrogen or are as defined for $R^1$ to $R^5$.

These electrolytes can be employed in electrochemical cells containing cathodes made from customary lithium intercalation and insertion compounds, but also containing cathode materials consisting of lithium mixed oxide particles coated with one or more metal oxides (DE 199 22 522) or polymers (DE 199 46 066).

0% for the control and from 0.1 to 10% (based on the total weight of conductive salt) of additives from the group consisting of organic alkali metal salts are added. Particular preference is given to additives from the group consisting of organic alkali metal borates and alkali metal alkoxides or tetraalkylammonium borates and alkoxides. From 0.1 to 7% of additives are preferably added to the conductive salt.

On evaluation of the measurement curves, it becomes clear that the additive decomposes by reduction at potentials of about 900–1000 mV against Li/li⁺.

Through the reduction of the additive, more capacity, compared with conventional systems, is consumed in the last cycle. At the latest after the 3rd cycle, however, significantly higher cycling yields are obtained than without additive.

b) Behaviour of the additives at high potentials
In each case, 3–5 cyclic voltammograms were recorded successively in a measurement cell containing a stainless-steel, platinum or gold working electrode, a lithium counterelectrode and a lithium reference electrode. To this end, starting from the rest potential, the potential was firstly increased at a rate of from 1 mV/s to 100 mV/s to voltages above the respective decomposition potential of the corresponding additive against Li/Li⁺, and then moved back to the rest potential.

Depending on the oxidation potential, the additives are oxidized in the first cycle at potentials of from 3 V to 5 V against Li/Li⁺. However, this oxidation does not result in a lasting current increase, as in conventional salts, such as $LiPF_6$, Li imide or Li methanide, but, after passing through a maximum with relatively low currents, results in the formation of a passivating coating layer on the working electrode.

Electrolytes which can be used are solutions of $LiPF_6$, $LiBF_4$, $LiClO_4$, $LiAsF_6$, $LiCF_3SO_3$, $LiN(CF_3SO_2)_2$ or $LiC(CF_3SO_2)_3$, and mixtures thereof, in aprotic solvents, such as EC, DMC, PC, DEC, BC, VC, cyclopentanone, sulfolane, DMS, 3-methyl-1,3-oxazolidin-2-one, γ-butyrolactone, EMC, MPC, BMC, EPC, BEC, DPC, 1,2-diethoxymethane, THF, 2-methyltetrahydrofuran, 1,3-dioxolane, methyl acetate, ethyl acetate and mixtures thereof. 0% for the control and from 0.1 to 10% (based on the total weight of conductive salt) of additives from the group consisting of organic alkali metal salts are added. Particular preference is given to additives from the group consisting of organic alkali metal borates and alkali metal alkoxides. From 0.1 to 7% of additives are particularly preferably added to the conductive salt.

c) Properties of the coating layer formed by oxidation
In each case, 3–5 cyclic voltammograms are recorded successively in a measurement cell containing a stainless-steel working electrode, a lithium counterelectrode and a lithium reference electrode. Starting from the rest potential, the potential is firstly increased at a rate of 10 mV/s–20 mV/s to values above the respective decomposition potential of the corresponding additives. The coating layer is deposited on the electrode in the process. The potential is then lowered to values below 0 V against Li/Li⁺, thus initiating lithium deposition on the stainless-steel electrode. To this end, lithium ions must migrate through the film formed. In order to exclude dissolution of the coating layer during this process, the potential is again increased to values above the respective decomposition potential of the salts mentioned. Lithium cycling (evident from deposition and dissolution peaks at low potentials) is possible in the electrolyte. Furthermore, the coating layer is not dissolved by the selected process, since otherwise oxidation of the salt used at the above-mentioned potentials would have to be detectable in the second and all subsequent cycles.

d) Application of the coating layer to certain cathode materials
$LiMn_2O_4$, $LiCoO_2$, $LiNiO_2$ and $LiNi_xCo_{1-x}O_2$ cathodes are particularly interesting. In a measurement cell, a working electrode having one of the compositions indicated here, a lithium counterelectrode and a lithium reference electrode are used.

Electrolytes which can be used are solutions of $LiPF_6$, $LiBF_4$, $LiClO_4$, $LiAsF_6$, $LiCF_3SO_3$, $LiN(CF_3SO_2)_2$ or $LiC(CF_3SO_2)_3$, and mixtures thereof, in aprotic solvents, such as EC, DMC, PC, DEC, BC, VC, cyclopentanone, sulfolane, DMS, 3-methyl-1,3-oxazolidin-2-one, γ-butyrolactone, EMC, MPC, BMC, EPC, BEC, DPC, 1,2-diethoxymethane, THF, 2-methyltetrahydrofuran, 1,3-dioxolane, methyl acetate, ethyl acetate and mixtures thereof. 0% for the control and from 0.1 to 10% (based on the total weight of conductive salt) of additives from the group consisting of organic alkali metal salts are added. Particular preference is given to additives from the group consisting of organic alkali metal borates and alkali metal alkoxides. From 0.1 to 7% of additives are preferably added to the conductive salt.

Starting from the rest potential, the cathodes are first fully charged against Li/Li⁺.

The cathode is subsequently overcharged. During this operation, the voltage reaches an upper value determined by the measurement arrangement. If the potentiostat/galvanostat is then switched off, the potential drops very rapidly.

Compared with the reference, the increase in potential in the range 4.3–6 V against Li/Li$^+$ is slower in the case of the additive-containing electrolytes according to the invention.

After the potentiostat/galvanostat has been switched off (release of the disconnector is simulated), the potential of the cathode drops rapidly in both electrolytes.

In the case of the electrolyte without additive, the potential oscillates at values around 4.2–4.3 V against Li/Li$^+$. Accordingly, the cathode remains in the charged, high-energy state.

By contrast, the addition of additives causes a lowering of the potential. The potential then corresponds to the rest potential of an uncharged electrode. This suggests that additives or the film formed by decomposition of the additive is capable of dissipating the "excess potential" in a controlled manner by internal self-discharge and thus converting the battery into a low-energy state after release of the safety means (for example disconnector).

Particularly suitable additives according to the invention are compounds of the following formula:

$$\mathrm{Li}^+\mathrm{B}^-(\mathrm{OR}^1)_m(\mathrm{OR}^2)_p \quad (\mathrm{I})$$

in which m and p are 0, 1, 2, 3 or 4, where m+p=4, and

R$^1$ and R$^2$ are identical or different, are optionally bonded directly to one another by a single or double bond, and are each, individually or together, an aromatic or aliphatic carboxylic or sulfonic acid, or are each, individually or together, an aromatic ring from the group consisting of phenyl, naphthyl, anthracenyl and phenanthrenyl, which may be unsubstituted or mono- to tetrasubstituted by A or Hal, or, are each, individually or together, a heterocyclic aromatic ring from the group consisting of pyridyl, pyrazyl and bipyridyl, which may be unsubstituted or mono- to trisubstituted by A or Hal, or are each, individually or together, an aromatic hydroxy acid from the group consisting of aromatic hydroxycarboxylic acids and aromatic hydroxysulfonic acids, which may be unsubstituted or mono- to tetrasubstituted by A or Hal, and Hal is F, Cl or Br and A is alkyl having 1 to 6 carbon atoms, which may be mono- or trihalogenated.

Particularly suitable compounds are also those of the following formula:

$$\mathrm{Li}^-\mathrm{OR}^- \quad (\mathrm{II})$$

in which R is an aromatic or aliphatic carboxylic or sulfonic acid, or is an aromatic ring from the group consisting of phenyl, naphthyl, anthracenyl and phenanthrenyl, which may be unsubstituted or mono- to tetrasubstituted by A or Hal, or is an aromatic heterocyclic ring from the group consisting of pyridyl, pyrazyl and bipyridyl, which may be unsubstituted or mono- to trisubstituted by A or Hal, or is an aromatic hydroxy acid from the group consisting of aromatic hydroxycarboxylic acids and aromatic hydroxysulfonic acids, which may be unsubstituted or mono- to tetrasubstituted by A or Hal, and Hal is F, Cl or Br and A is alkyl having 1 to 6 carbon atoms, which may be mono- to trihalogenated.

Particularly preferred additives are lithium bis[1,2-benzenediolato(2-)O,O']borate(1-), lithium bis[3-fluoro-1,2-benzenediolato(2-)O,O']borate(1-), lithium bis[2,3-naphthalenediolato(2-)O,O']borate(1-), lithium bis[2,2'-biphenyldiolato(2-)O,O']borate (1-), lithium bis[salicylato(2-)O,O']borate(1-), lithium bis[2-olato-benzenesulfonato(2-)O,O']borate(1-), lithium bis[5-fluoro-2-olatobenzenesulfonato(2-)O,O']borate, lithium phenoxide and lithium 2,2-biphenoxide.

Suitable additives according to the invention are also compounds of the formula (III), which exhibit similar properties to the compounds of the formulae (I) and (II):

$$[\mathrm{NR'}_w\mathrm{R''}_x\mathrm{R'''}_y\mathrm{R''''}_z]^+\mathrm{A}^- \quad (\mathrm{III})$$

where w, x, y and z can be 0, 1, 2, 3 or 4, where w+x+y+z=4, and

R$'_w$, R$''_x$, R$'''_y$ and R$''''_z$ are identical or different and are each alkyl having 1 to 8 carbon atoms which may in each case be mono- to trihalogenated, and A$^-$ is OR$^1$ or B(OR$^1$)$_m$(OR$^2$)$_p$, in which m and p are 0, 1, 2, 3 or 4, where m+p=4, and R$^1$ and R$^2$ are identical or different, are optionally bonded directly to one another by a single or double bond, and are each, individually or together, an aromatic or aliphatic carboxylic, dicarboxylic or sulfonic acid radical, or are each, individually or together, an aromatic ring from the group consisting of phenyl, naphthyl, anthracenyl and phenanthrenyl, which may be unsubstituted or mono- to tetrasubstituted by A or Hal, or, are each, individually or together, a heterocyclic aromatic ring from the group consisting a pyridyl, pyrazyl and bipyridyl, which may be unsubstituted or mono- to trisubstituted by A or Hal, or are each, individually or together, an aromatic hydroxy acid from the group consisting of aromatic hydroxycarboxylic acids and aromatic hydroxysulfonic acids, which may be unsubstituted or mono- to tetrasubstituted by A or Hal, and Hal is F, Cl or Br and A is alkyl having 1 to 6 carbon atoms, which may in each case be mono- to trihalogenated.

Suitable additives according to the invention are also compounds of the following formula:

$$\mathrm{Z}^+\mathrm{P}^-(\mathrm{OR}^1)_m(\mathrm{OR}^2)_p(\mathrm{OR}^3)_q \quad (\mathrm{IV})$$

where $Z^+$ is $Li^+$ or $[NR'_w R''_x R'''_y R''''_z]^+$, where w, x, y and z can be 0, 1, 2, 3 or 4, where w+x+y+z=4, and $R'_w$, $R''_x$, $R'''_y$ and $R''''_z$ are identical or different and are each alkyl having 1 to 8 carbon atoms which can in each case be mono- to trihalogenated, and where m, p and q are 0, 1, 2, 3, 4, 5 or 6, where m+p+q=6, and $R^1$, $R^2$ and $R^3$ are identical or different, are optionally bonded directly to one another by a single or double bond, and are each, individually or together, an aromatic or aliphatic carboxylic, dicarboxylic or sulfonic acid radical, or are each, individually or together, an aromatic ring from the group consisting of phenyl, naphthyl, anthracenyl and phenanthrenyl, which may be unsubstituted or mono- to tetrasubstituted by A or Hal, or, are each, individually or together, a heterocyclic aromatic ring from the group consisting a pyridyl, pyrazyl and bipyridyl, which may be unsubstituted or mono- to trisubstituted by A or Hal, or are each, individually or together, an aromatic hydroxy acid from the group consisting of aromatic hydroxycarboxylic acids and aromatic hydroxysulfonic acids, which may be unsubstituted or mono- to tetrasubstituted by A or Hal, and Hal is F, Cl or Br and A is alkyl having 1 to 6 carbon atoms, which may be mono- to trihalogenated.

The following examples are intended to illustrate the invention in greater detail, but without representing a limitation.

In the foregoing and in the following examples, all parts and percentages are by weight. The entire disclosure of all applications, patents and publications, cited above and below, and of corresponding German Application No. 199 19 968 filed Mar. 12, 1999 is hereby incorporated by reference.

EXAMPLES

Example 1

In each case, 3 cyclic voltammograms were recorded successively in a measurement cell containing a graphite anode (SGF 44 with PVDF binder), a lithium counterelectrode and a lithium reference electrode. To this end, starting from the rest potential, the potential was firstly lowered at a rate of 0.1 mV/s to 0 V against $Li/Li^+$ and then moved back to the rest potential.

The electrolytes used were solutions of $LiPF_6$ in EC/DMC (1:1) containing 0% (control), 1% and 5% (based on the weight of $LiPF_6$) of lithium bis[salicylato(2-)-O,O']borate (1-) (abbreviated to lithium salborate).

Figure 1:
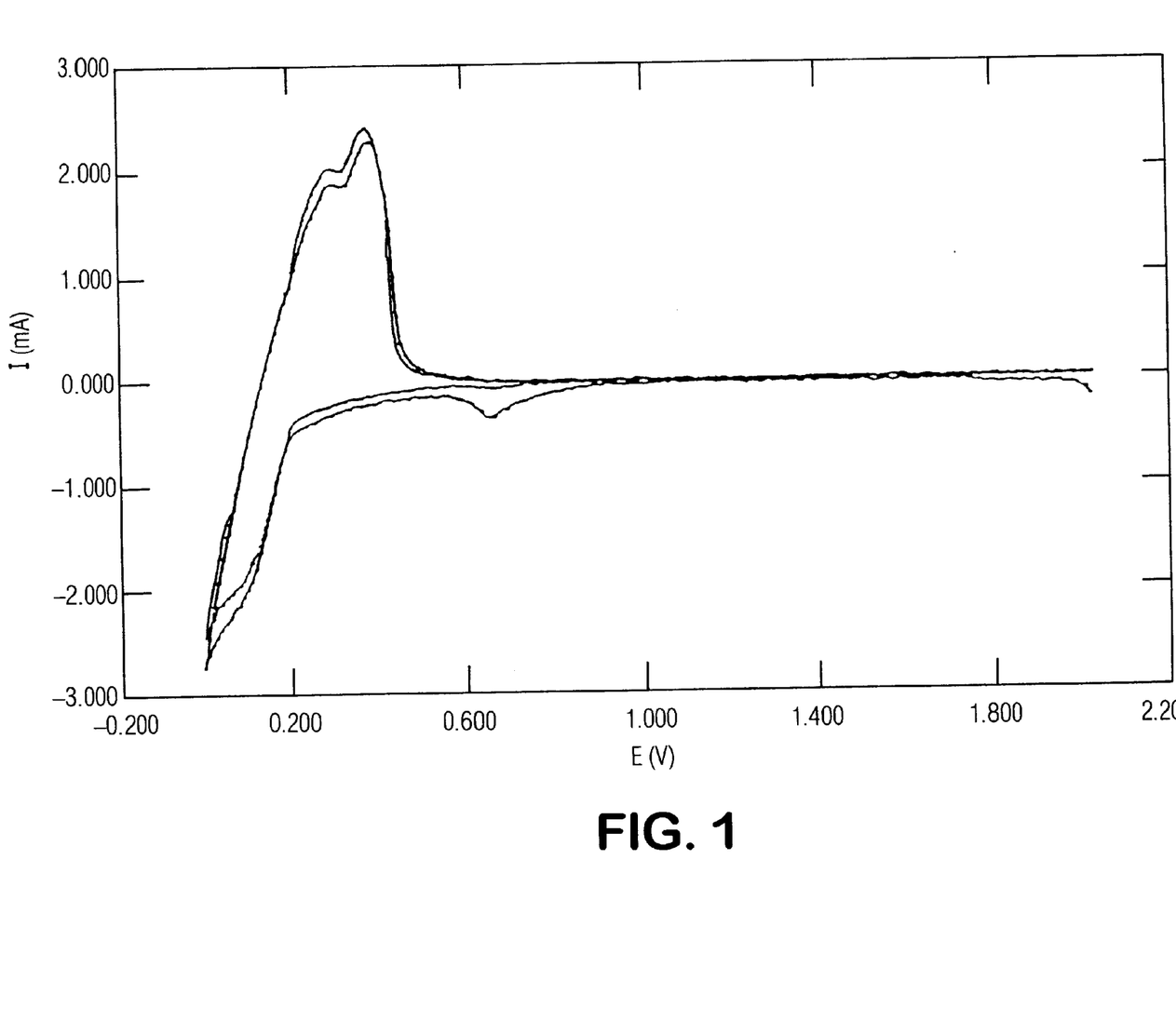
FIG. 1 shows a voltammogram for the experiment of Example 1.
Figure 2:
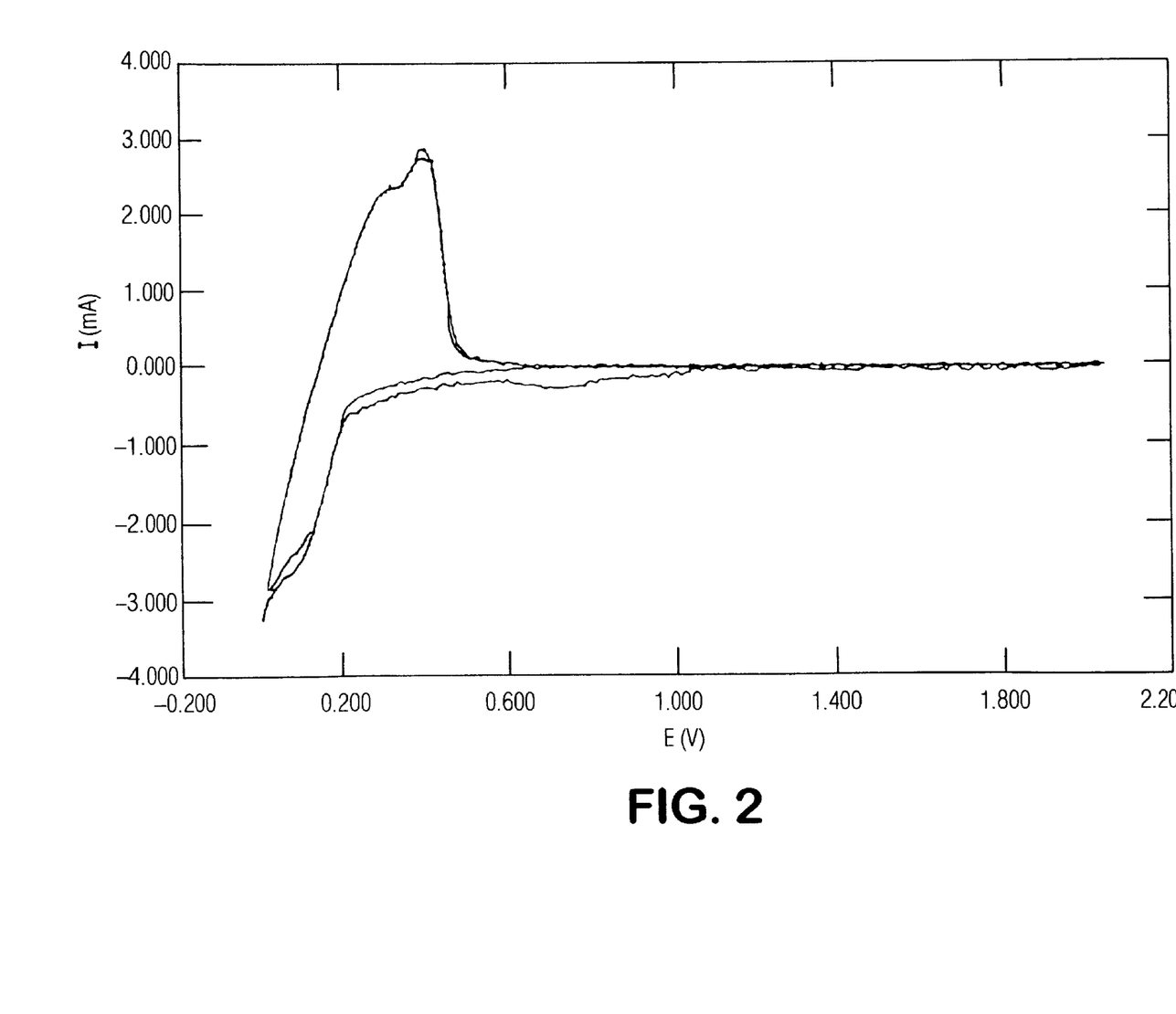
FIG. 2 shows a voltammogram for the experiment of Example 1.
Figure 3:
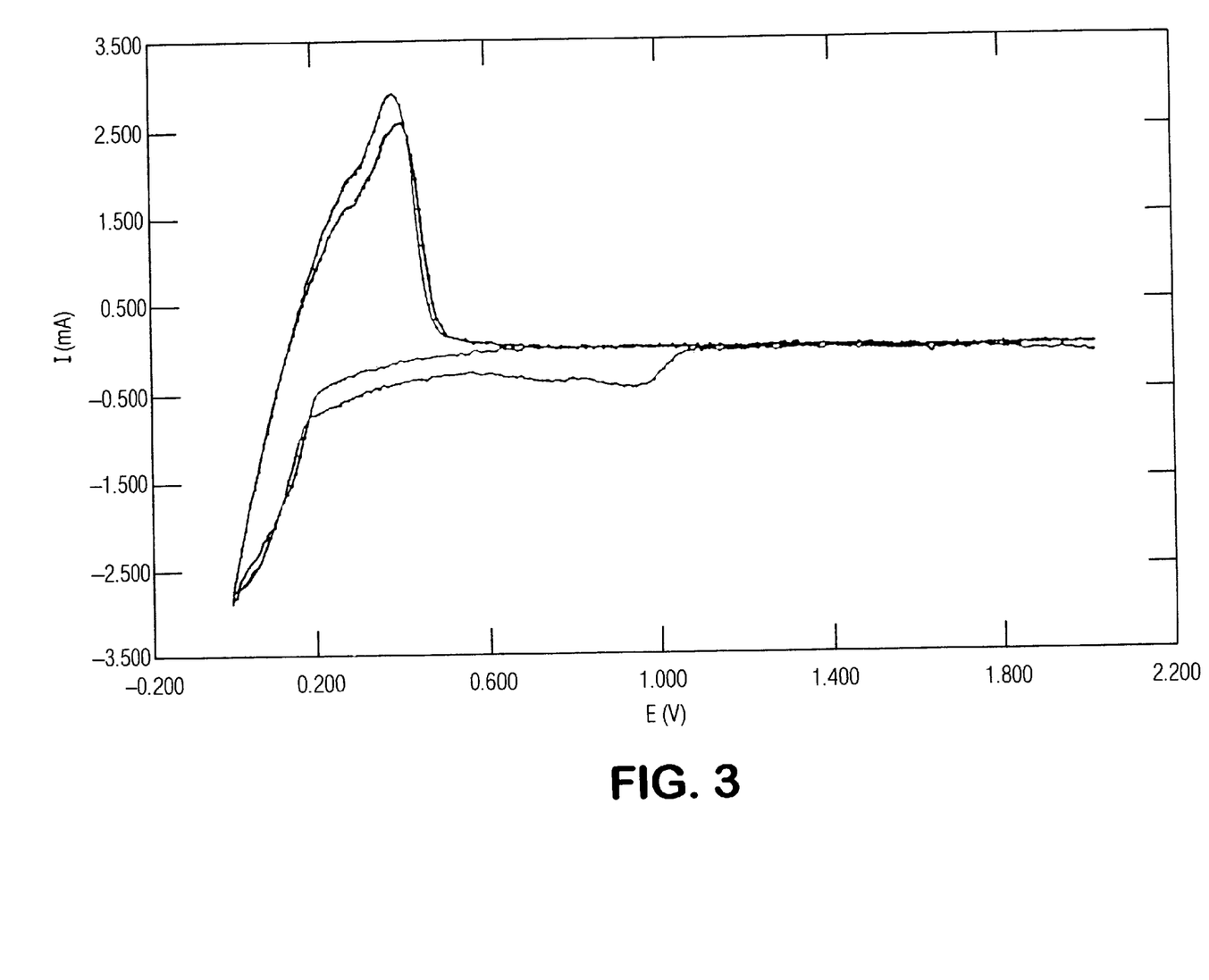
FIG. 3 shows a voltammogram for the experiment of Example 1.

The results are shown in Table 1 and in FIGS. 1, 2 and 3.

TABLE 1

Cycling yields on graphite

| Electrolyte | Yield 1st cycle | Yield 3rd cycle |
|---|---|---|
| 1 M $LiPF_6$ in EC/DMC (1:1) | 71.7% | 90.5% |
| 1 M $LiPF_6$ in EC/DMC (1:1) + 1% lithium bis[salicylato(2-)O,O']-borate(1-) | 69.5% | 95.5% |
| 1 M $LiPF_6$ in EC/DMC (1:1) + 5% lithium bis[salicylato(2-)O,O']-borate(1-) | 61.3% | 95.1% |

It is clearly evident from FIGS. 1 and 2 that the additive decomposes just before the film formation by ethylene carbonate. The reduction potential can be given as about 900–1000 mV against $Li/Li^+$.

The reduction of the additive causes a somewhat greater consumption of capacity in the first cycle. This disadvantage is compensated for from the third cycle. Significantly higher cycling yields are obtained.

Example 2

Passivation of the cathode

Lithium salts have been found which participate actively in the build-up of a passivating coating layer on the cathode. The coating layer formed is permeable to lithium ions.

TABLE 2

Selected lithium salts

| Anion | $E_{ox}$ vs. $Li/Li^+$ [V] |
|---|---|
| Bis[1,2-benzenediolato(2-)O,O']-borate (1-) | 3.6 |
| Bis[3-fluoro-1,2-benzenediolato(2-)-O,O']borate (1-) | 3.75 |
| Bis[2,3-naphthalenediolato(2-)O,O']-borate (1-) | 3.8 |

TABLE 2-continued

Selected lithium salts

| Anion | $E_{ox}$ vs. Li/Li$^+$ [V] |
|---|---|
| Bis[2,2'-biphenyldiolato(2-)O,O']-borate (1-) | 4.1 |
| Bis[salicylato(2-)O,O']borate(1-) | 4.5 |
| Bis[2-olatobenzenesulfonato(2-)-O,O']borate(1-) | 4.3 |
| Bis[5-fluoro-2-olatobenzene-sulfonato (2-)O,O']borate | 4.5 |
| Phenoxide | 3.5 |
| 2,2-Biphenoxide | 3.7 |

2a) Experiments of platinum electrodes

In each case, 5 cyclic voltammograms were recorded successively in a measurement cell containing a stainless-steel, platinum or gold working electrode, a lithium counterelectrode and a lithium reference electrode. To this end, starting from the rest potential, the potential was firstly increased at a rate of 10 mV/s or 20 mV/s to 5 V against Li/Li$^+$ and then moved back to the rest potential.

Figure 4:
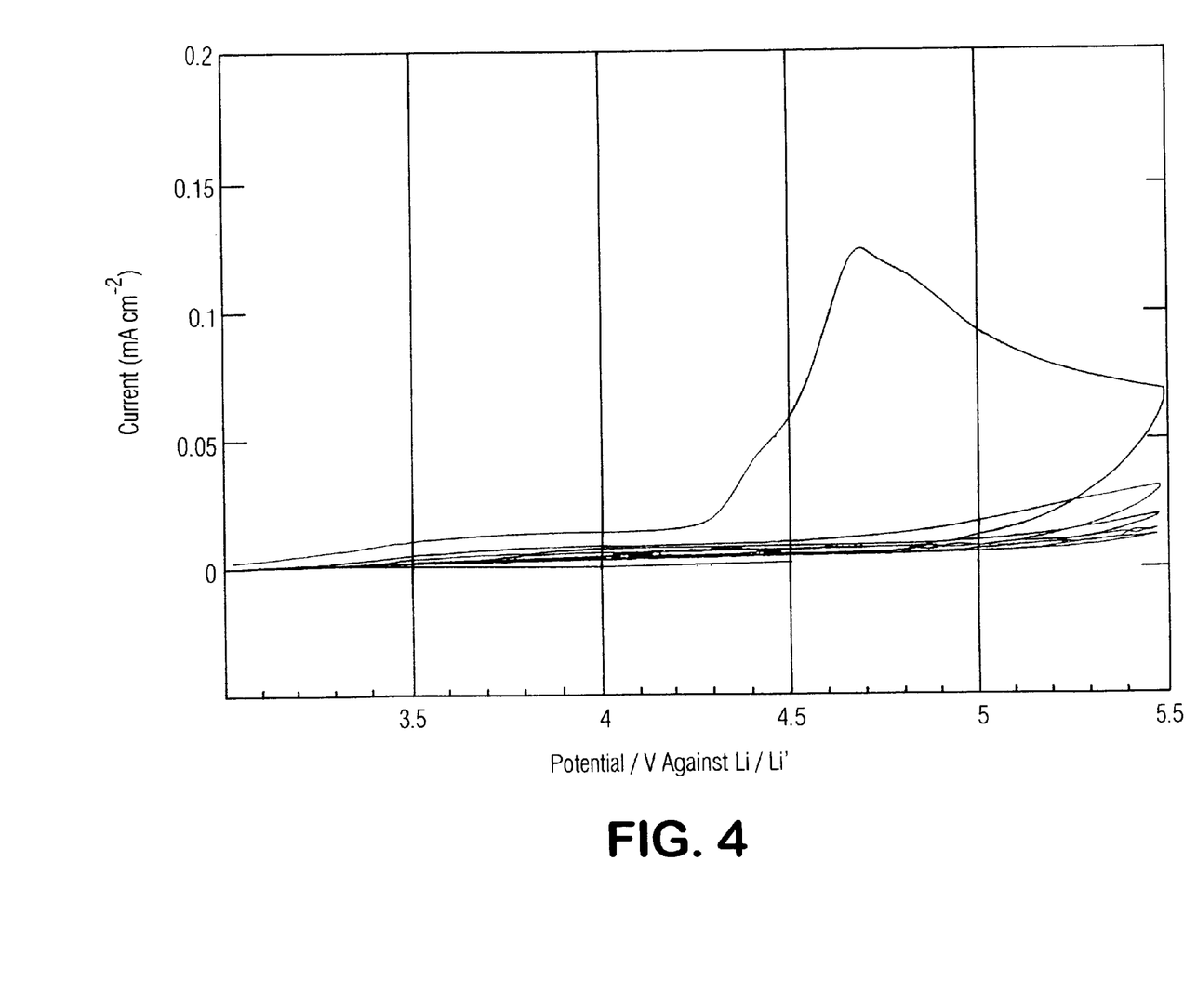

The salts shown in Table 2 exhibit the following characteristic behaviour. Depending on the oxidation potential, the salts mentioned are oxidized at potentials between 3.5 and 4.5 V against Li/Li$^+$. However, this oxidation does not result in a lasting current increase, as in other salts, such as LiPF$_6$, Li imide or Li methanide, but, after passing through a maximum with relatively low currents, results in the formation of a passivating coating layer on the working electrode. FIG. 4 shows this using the example of lithium bis[2-olatobenzenesulfonato(2-)O,O']borate(1-).

2b) Properties of the coating layer formed

Figure 5:
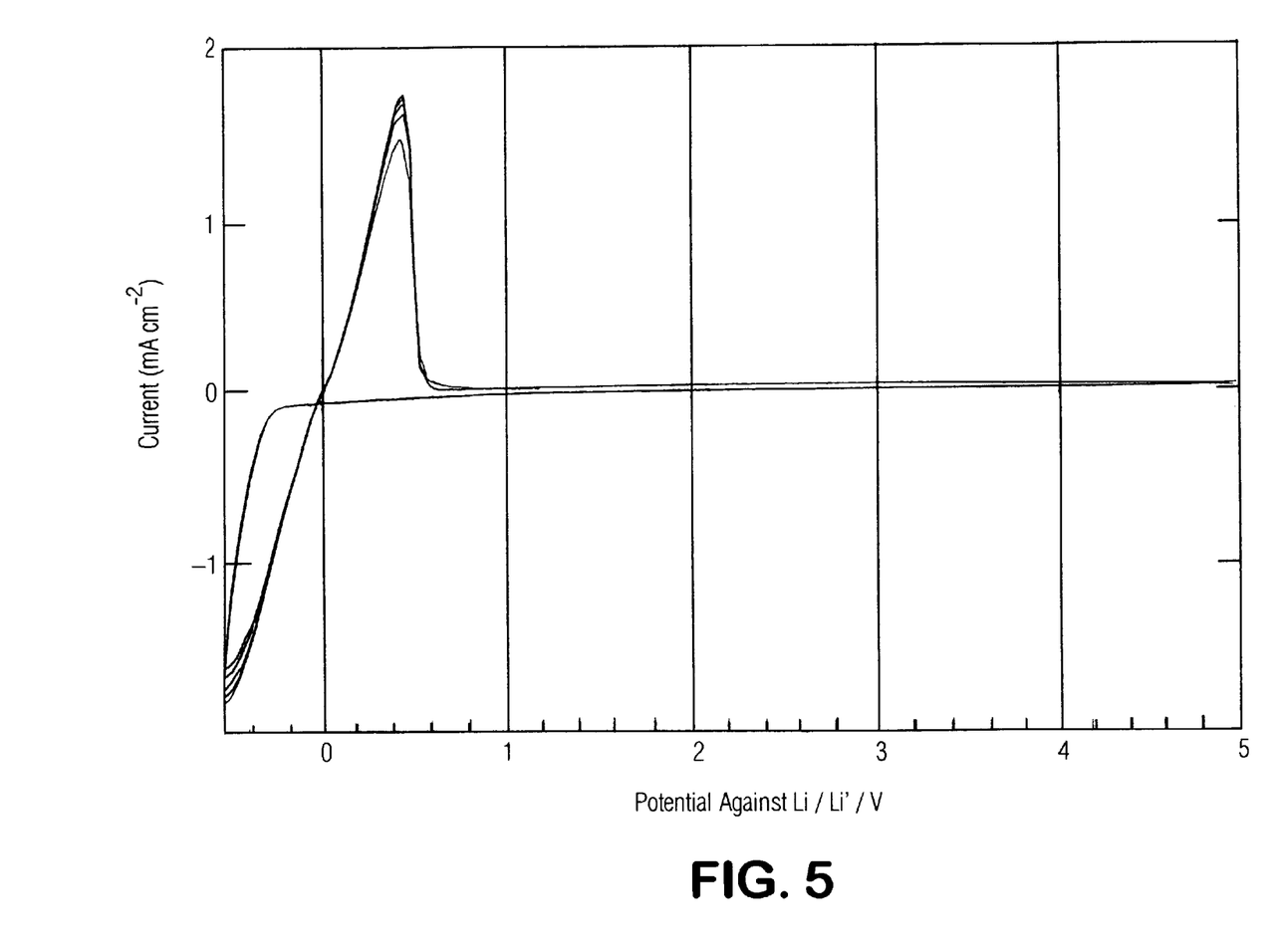
FIG. 5 shows a voltammogram for the experiment of Example 2b.

In each case, 5 cyclic voltammograms were recorded successively in a measurement cell containing a stainless-steel working electrode, a lithium counterelectrode and a lithium reference electrode. To this end, starting from the rest potential, the potential was firstly increased at a rate of 10 mV/s–20 mV/s to values above the respective decomposition potential of the salts mentioned. A coating layer was deposited on the electrode in the process. The potential was then lowered to values below 0 V against Li/Li$^+$, initiating deposition of lithium on the stainless-steel electrode. To this end, lithium ions must migrate through the film formed. In order to exclude dissolution of the coating layer during this operation, the potential was again increased to values above the respective decomposition potential of the salts mentioned. FIG. 5 shows, in representative terms, the results obtained for lithium bis[2-olatobenzenesulfonato(2-)O,O'] borate(1-). Lithium cycling is possible in the electrolyte. This is evident from the deposition and dissolution peaks at low potentials. Furthermore, the coating layer is not dissolved by the selected process, since otherwise oxidation of the salt used at the abovementioned potentials would have to be detectable in the second and all subsequent cycles.

Example 3

Cycling experiments are carried out in button cells containing a metallic lithium anode and LiCoO$_2$. The electrolytes used were solutions of LiPF$_6$ in EC/DMC (1:1) containing 0% (control), 1% and 5% (based on the weight of LiPF$_6$) of lithium bis[salicylato(2-)-O,O']borate(1-).

The results are shown in Tables 3, 4 and 5.

TABLE 3

System 1 M LiPF$_6$ in EC/DMC (1:1)

| Cycle Number | Charge capacity [mAh/g] | Discharge capacity [mAh/g] |
|---|---|---|
| 1 | 164.6 | 153.4 |
| 2 | 155.1 | 153.6 |
| 3 | 155.0 | 153.8 |

TABLE 4

System 1 M LiPF$_6$ in EC/DMC (1:1) + 1% lithium bis[salicylato(2-)O,O']borate(1-)

| Cycle Number | Charge capacity [mAh/g] | Discharge capacity [mAh/g] |
|---|---|---|
| 1 | 164.0 | 153.7 |
| 2 | 155.2 | 153.0 |
| 3 | 154.0 | 152.8 |
| 4 | 153.4 | 152.5 |

TABLE 5

System 1 M LiPF$_6$ in EC/DMC (1:1) + 5% lithium bis[salicylato(2-)-O,O']borate(1-)

| Cycle Number | Charge capacity [mAh/g] | Discharge capacity [mAh/g] |
|---|---|---|
| 1 | 163.4 | 149.8 |
| 2 | 151.0 | 148.9 |
| 3 | 149.5 | 148.1 |
| 4 | 148.4 | 147.1 |

It can be seen from the values shown that addition of 1% of borate does not have an adverse effect on the performance of the cathode used.

Example 4

Behaviour of the additive lithium (bis[salicylato(2-)-O,O']borate(1-) on overcharging The following measurement cycle was recorded in a measurement cell containing a LiCoO$_2$ working electrode, a lithium counterelectrode and a lithium reference electrode.

The electrolyte used was solutions of LiPF$_6$ in EC/DMC (1:1) containing 0% (reference) or 1.5% of lithium bis[salicylato(2-)O,O']borate(1-).

Starting from the rest potential, the cathode was firstly charged at a charge rate of C/15–C/18 to 4.3 V against Li/Li$^+$.

The cathode was subsequently overcharged at a charge rate of C/5. During this operation, the voltage reached a specified maximum value of 6 V against Li/Li$^+$. If the potentiostat/galvanostat is then switched off, the potential drops very rapidly.

Figure 6:
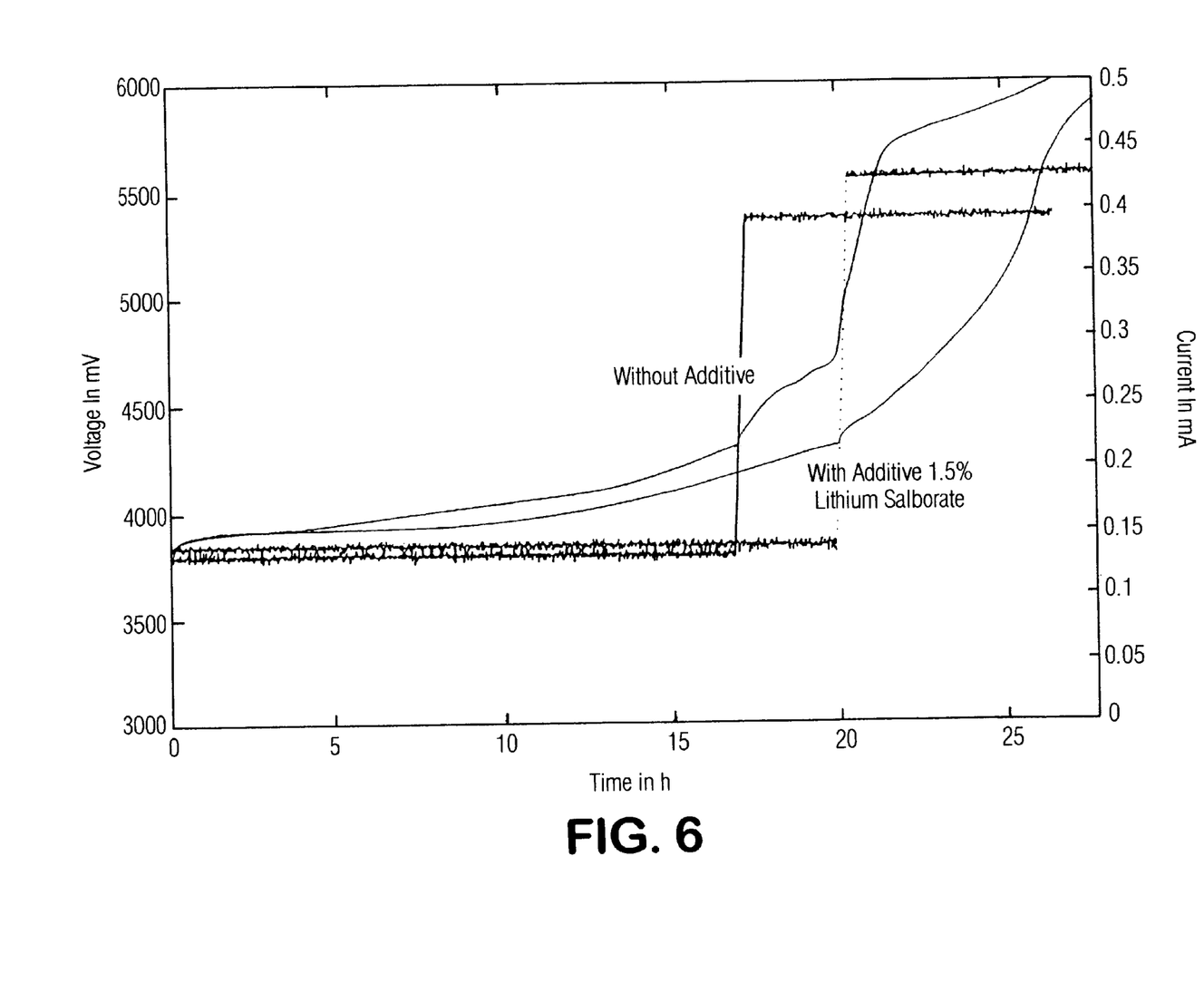
FIG. 6 depicts the experiment of Example 4, showing a charging-discharging curve.
Figure 7:
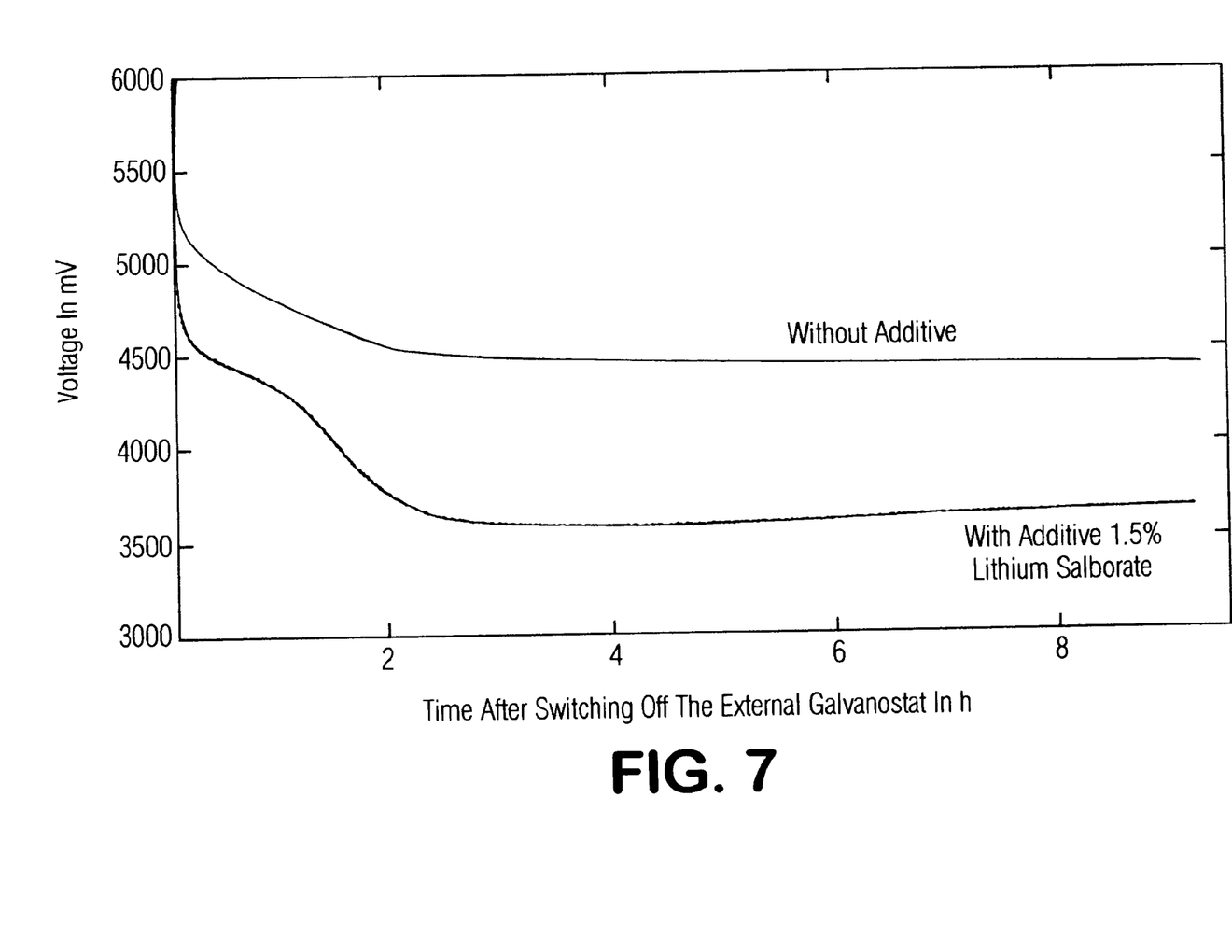
FIG. 7 depicts the experiment of Example 4, showing a charging-discharging curve.

Comparison of the curves (FIGS. 6 and 7):

Compared with the reference, the potential increase in the region 4.3–6 V against Li/Li$^+$ is slower in the case of the electrolyte containing lithium bis[salicylato(2-)-O,O']borate (1-). This can be explained by a desired decomposition of the additive and the consequent formation of a coating layer.

After the external potentiostat/galvanostat has been switched off, thus simulating release of the disconnector, the potential of the cathode in both electrolytes drops rapidly.

In the case of the electrolyte with no additive, the potential oscillates about values of 4.2–4.3 V against Li/Li$^+$. The cathode remains in the charged, high-energy state.

By contrast, addition of lithium bis[salicylato(2-)-O,O']borate(1-) causes the potential to drop to values of about 3.7 V against Li/Li$^+$. This corresponds to the rest potential of an uncharged LiCoO$_2$ electrode. This suggests that lithium bis[salicylato(2-)-O,O']borate(1-) or the film formed by decomposition of the additive is capable of dissipating the "excess potential" in a controlled manner by internal self-discharge and thus converting the battery into a low-energy state after release of a safety means (for example disconnector).

Example 5

Cycling experiments are carried out in button cells containing a metallic lithium anode and LiMn$_2$O$_4$. The electrolytes used are solutions of LiPF$_6$ in EC/DMC (1:1) containing 0% (control) and 0.2% (based on the weight of the elctrolyte) of lithium bis[2,2'-biphenyldiolato(2-)-O,O']borate(1-).

TABLE 6

System 1 M LiPF$_6$ in EC/DMC (1:1)

| Cycle Number | Charge capacity [mAh/g] | Discharge capacity [mAh/g] |
|---|---|---|
| 1 | 119.8 | 112.5 |
| 2 | 111.8 | 111.6 |
| 3 | 111.0 | 110.3 |
| 4 | 109.8 | 110.2 |
| 5 | 111.5 | 110.8 |
| 6 | 109.6 | 109.0 |
| 7 | 108.7 | 108.8 |
| 8 | 108.7 | 108.8 |
| 9 | 109.0 | 108.7 |
| 10 | 108.1 | 107.7 |

TABLE 7

System 1 M LiPF$_6$ in EC/DMC (1:1) + 0.2% of lithium bis[2,2'-biphenyldiolato(2-)O,O']borate(1-)

| Cycle Number | Charge capacity [mAh/g] | Discharge capacity [mAh/g] |
|---|---|---|
| 1 | 130.5 | 119.8 |
| 2 | 118.4 | 117.0 |
| 3 | 118.6 | 117.4 |
| 4 | 117.7 | 116.5 |
| 5 | 116.5 | 115.5 |
| 6 | 116.9 | 114.8 |
| 7 | 116.4 | 114.4 |
| 8 | 114.5 | 113.4 |
| 9 | 113.8 | 112.8 |
| 10 | 113.9 | 113.6 |

It can be seen from the values shown that addition of 0.2% of lithium bis[2,2'-biphenyldiolato(2-)-O,O']borate(1-) has a significant, positive effect on the performance of the cathode used.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

We claim:

1. An electrolyte comprising a lithium containing conductive salt selected from the group consisting of methanides, triflates, and imides dissolved in an aprotic solvent, wherein the electrolyte further comprises at least one organic alkali metal salt as an additive, wherein the organic alkali metal salt is a lithium borate of the formula (I)

$$\text{Li}^+\text{B}^-(\text{OR}^1)_m(\text{OR}^2)_p \quad (I)$$

in which m and p are 0, 1, 2, 3, or 4, where m+p=4
and

R$^1$ and R$^2$ are identical or different, are optionally bonded directly to one another by a single or double bond, and are each, individually or together, an aromatic or aliphatic carboxylic, dicarboxylic or sulfonic acid, or are each, individually or together, an aromatic ring selected
from the group consisting of phenyl, naphthyl, anthracenyl and phenanthrenyl, which is optionally unsubstituted or mono- to tetrasubstituted by A or Hal, or
are each, individually or together, a heterocyclic aromatic ring selected from the group consisting of pyridyl, pyrazyl and bipyridyl, which is optionally unsubstituted or mono- to trisubstituted by A or Hal, or
are each, individually or together, an aromatic hydroxy acid selected from the group consisting of aromatic hydroxycarboxylic acids and aromatic hydroxysulfonic acids, which is optionally unsubstituted or mono- to tetrasubstituted by A or Hal, and Hal is F, Cl or Br and A is alkyl having 1 to 6 carbon atoms, which may be mono- to trihalogenated, wherein the organic alkali metal salt additive is present in concentrations of from 0.1 to 10% by weight based on the weight of conductive salt.

2. An electrolyte according to claim 1, wherein the organic alkali metal salt additive is selected from the group consisting of
lithium bis[1,2-benzenediolato(2-)0,0']borate(1-),
lithium bis[3-fluoro-1,2-benzenediolato(2-)0,0']borate(1-),
lithium bis[2,3-naphthalenediolato(2-)0,0']borate(1-),
lithium bis[2,2'-biphenyldiolato(2-)0,0']-borate(1-),
lithium bis[2-olatobenzene-sulfonato(2-)0,0']borate(1-),
lithium bis[salicylato(2-)0,0']borate(1-),
lithium bis[5-fluoro-2-olatobenzenesulfonato(2-)0,0']borate,
lithium bis[oxalato(2-)0,0']borate and lithium bis[molonato(2-)0,0']borate.

3. An electrochemical cell containing an electrolyte according to claim 1, further comprising an anode, a cathode, and a separator.

4. An electrochemical cell, battery or secondary lithium battery which comprises an electrolyte according to claim 1.

5. A secondary lithium battery comprising an electrolyte according to claim 1.

* * * * *